(12) United States Patent
Kaneda

(10) Patent No.: US 12,541,135 B2
(45) Date of Patent: Feb. 3, 2026

(54) PULSED LASER WITH TEMPORAL COHERENCE CONTROL

(71) Applicant: Arizona Board of Regents on Behalf of the University of Arizona, Tucson, AZ (US)

(72) Inventor: Yushi Kaneda, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 266 days.

(21) Appl. No.: 18/323,243

(22) Filed: May 24, 2023

(65) Prior Publication Data

US 2023/0387646 A1    Nov. 30, 2023

Related U.S. Application Data

(60) Provisional application No. 63/365,426, filed on May 27, 2022.

(51) Int. Cl.
    *G02F 1/39*    (2006.01)
    *G02F 1/37*    (2006.01)
    (Continued)

(52) U.S. Cl.
    CPC .......... *G02F 1/39* (2013.01); *G02F 1/37* (2013.01); *H01S 3/0085* (2013.01); *H01S 3/0092* (2013.01); *H01S 3/06754* (2013.01); *H01S 3/0816* (2013.01); *H01S 3/094003* (2013.01); *H01S 3/094076* (2013.01); *H01S 3/1083* (2013.01); *H01S 3/1123* (2023.01); *H01S 3/1608* (2013.01); *H01S 3/1611* (2013.01);
    (Continued)

(58) Field of Classification Search
    CPC . G02F 1/37; G02F 1/39; H01S 3/0085; H01S 3/0092; H01S 3/1083
    See application file for complete search history.

(56) References Cited

U.S. PATENT DOCUMENTS 5,717,676 A    2/1998    Kaneda et al.
5,760,408 A    6/1998    Kikuchi et al.
(Continued)

OTHER PUBLICATIONS

Kawai, H., "UV light source using fiber amplifier and nonlinear wavelength conversion," Core Technology Center, Nikon Corporation.

(Continued)

*Primary Examiner* — Daniel Petkovsek
(74) *Attorney, Agent, or Firm* — Perkins Coie LLP

(57) ABSTRACT

Methods, systems and methods for reducing temporal coherence of laser systems are described. One example laser system includes a seed laser having a continuous wave output and operable at a first wavelength, a phase modulator positioned to receive laser light from the seed laser and to impart phase modulation to the seed laser. The laser system also includes an optical parametric amplifier positioned to receive phase-modulated laser light at one of its inputs and a pump laser light at another input, and to produce an output beam having spectral characteristics of the phase-modulated laser light that is amplified according to a temporal feature of the pump laser light. In the example laser system, an output of the optical parametric amplifier has a lower temporal coherence compared to the seed laser.

17 Claims, 4 Drawing Sheets

(51) Int. Cl.
*H01S 3/00* (2006.01)
*H01S 3/067* (2006.01)
*H01S 3/081* (2006.01)
*H01S 3/094* (2006.01)
*H01S 3/108* (2006.01)
*H01S 3/1123* (2023.01)
*H01S 3/16* (2006.01)

(52) U.S. Cl.
CPC ........ *H01S 3/1643* (2013.01); *G02F 2203/11* (2013.01)

(56) References Cited

U.S. PATENT DOCUMENTS

| | | | |
|---|---|---|---|
| 6,128,030 | A | 10/2000 | Kikuchi et al. |
| 6,181,463 | B1 * | 1/2001 | Galvanauskas ........... G02F 1/39 |
| | | | 359/332 |
| 8,817,827 | B2 * | 8/2014 | Ter-Mikirtychev ........................ |
| | | | H01S 3/06758 |
| | | | 372/5 |
| 8,879,588 | B2 * | 11/2014 | Radic ...................... G02F 1/395 |
| | | | 372/20 |
| 10,274,809 | B1 * | 4/2019 | Pomeranz ................. G02F 1/39 |
| 2009/0201575 | A1 * | 8/2009 | Fermann ............. H01S 3/06754 |
| | | | 359/341.32 |
| 2009/0244695 | A1 * | 10/2009 | Marcinkevicius .... H01S 3/1083 |
| | | | 359/345 |
| 2017/0170621 | A1 * | 6/2017 | Miura ................... H01S 3/1305 |
| 2018/0046060 | A1 * | 2/2018 | Hugonnot ................ G02F 1/39 |

OTHER PUBLICATIONS

Ohtsuki, T., et al., "Efficient 193 nm generation by eighth harmonics of Er3+-doped fiber amplifier," Core Technology Center, Nikon Corporation.

* cited by examiner

PULSED LASER WITH TEMPORAL COHERENCE CONTROL

CROSS-REFERENCE TO RELATED APPLICATION(S)

This application claims priority to U.S. Provisional Application No. 63/365,426 titled "PULSED LASER WITH TEMPORAL COHERENCE CONTROL," filed on May 27, 2022. The entire contents of the above noted provisional application are incorporated by reference as part of the disclosure of this document.

TECHNICAL FIELD

The disclosed technology relates to laser systems, and more particularly to methods and devices for controlling coherence of laser systems.

BACKGROUND

Semiconductor manufacturing based on lithography calls for laser light sources at 193.4 nm wavelength, the same as an argon fluoride (ArF) laser, with a 6 kHz pulse repetition rate, mJ-class output energy (to be amplified by ArF amplifiers), and most importantly, spatial coherence and temporal incoherence (reduced coherence) for high-resolution imaging with reduced speckle noise. Such systems have several shortcomings that include the short life of ArF lasers, as well as the corrosive (and even poisonous) characteristics of ArF-based systems, making them expensive, inconvenient, and a health hazard that requires mitigating procedures to counter the carcinogenic effects of ArF.

An alternative solid-state approach has been proposed to amplify the pulsed diode laser at 1.547 μm and take the eighth harmonic to reach 193.4 nm. This approach, however, has limitations that include fiber nonlinearity with the high peak power.

SUMMARY

These and other shortcomings are addressed in the systems and methods that are disclosed herein, which alleviate the issues associated with fiber nonlinearity and allow for better control of temporal coherence. Reducing temporal coherence is important because it can lead to reduced speckle noise and uniformity of the illumination. The disclosed embodiments can be implemented in various embodiments to produce improved laser sources, such as those that can operate at a narrowband ultraviolet (UV) range of wavelengths. Non-limiting example applications of the disclosed technology include semiconductor manufacturing and processing, which utilize lasers with wavelengths at or around 193.4 nm, as well as other applications that require narrowband UV lasers.

One example laser system includes a seed laser having a continuous wave output and operable at a first wavelength, a phase modulator positioned to receive laser light from the seed laser and to impart phase modulation thereto. The laser system also includes an optical parametric amplifier positioned to receive phase-modulated laser light at one of its inputs and a pump laser light at another input, and to produce an output beam having spectral characteristics of the phase-modulated laser light that is amplified in accordance with a temporal feature of the pump laser light. In this laser system, an output of the optical parametric amplifier has a lower temporal coherence compared to the seed laser.

DETAILED DESCRIPTION

One technique to reduce temporal coherence is through phase modulation. In particular, if a signal voltage of a periodic function is applied across an electro-optical modulation device, the electrical field of the laser light undergoes phase modulation. As a result, the spectrum of the laser is split into several spaced-apart spectral components. In particular, the time-varying electric field, E(t), of a laser beam with frequency, $f_0$, and phase modulation, $\varphi(t)$, can be represented by:

$$E(t) = E_0(t) e^{[i2\pi f_0 t + i\varphi(t)]}.$$

When the phase modulation has a sinusoidal form with amplitude, m, and frequency, $f_m$, the electric field can be written as a series expansion using Bessel functions, $J_k(m)$, as:

$$E(t) = \Sigma_{k=-\infty}^{\infty} J_k(m) e^{[i2\pi (f_0 + k f_m) t]}.$$

It can be shown that the power spectrum of such a phase-modulated electric field may be represented by the sum total of the spectrum of the strength $J_k^2(m)$ that are separated by frequency $(f_0 + k f_m)$, for integer k, resulting in frequency broadening and reduced temporal coherence. If phase modulation is performed simultaneously using plural frequencies, the spectral components generated by phase modulation at a given frequency component are further divided by another frequency component for generating more spectral lines, resulting in further broadening of the spectrum. Some example implementation techniques for imparting phase modulation to a laser light can be found in U.S. Pat. No. 5,760,408, which is incorporated by reference in this patent document.

According to some disclosed embodiments, a laser source with a control on temporal coherence (spectral broadening) is seeded into an amplifier to give continuous wave (CW) output and then injected into an optical parametric amplifier (OPA) that is pumped by a pulsed laser. The temporal coherence (spectrum) is controlled by the seed light that enters the OPA, and the temporal shape (pulse width, repetition rate, timing, power) is determined by the pulsed pump laser. In some embodiments, the OPA material may be placed within the pulsed pump laser cavity.

Figure 1:
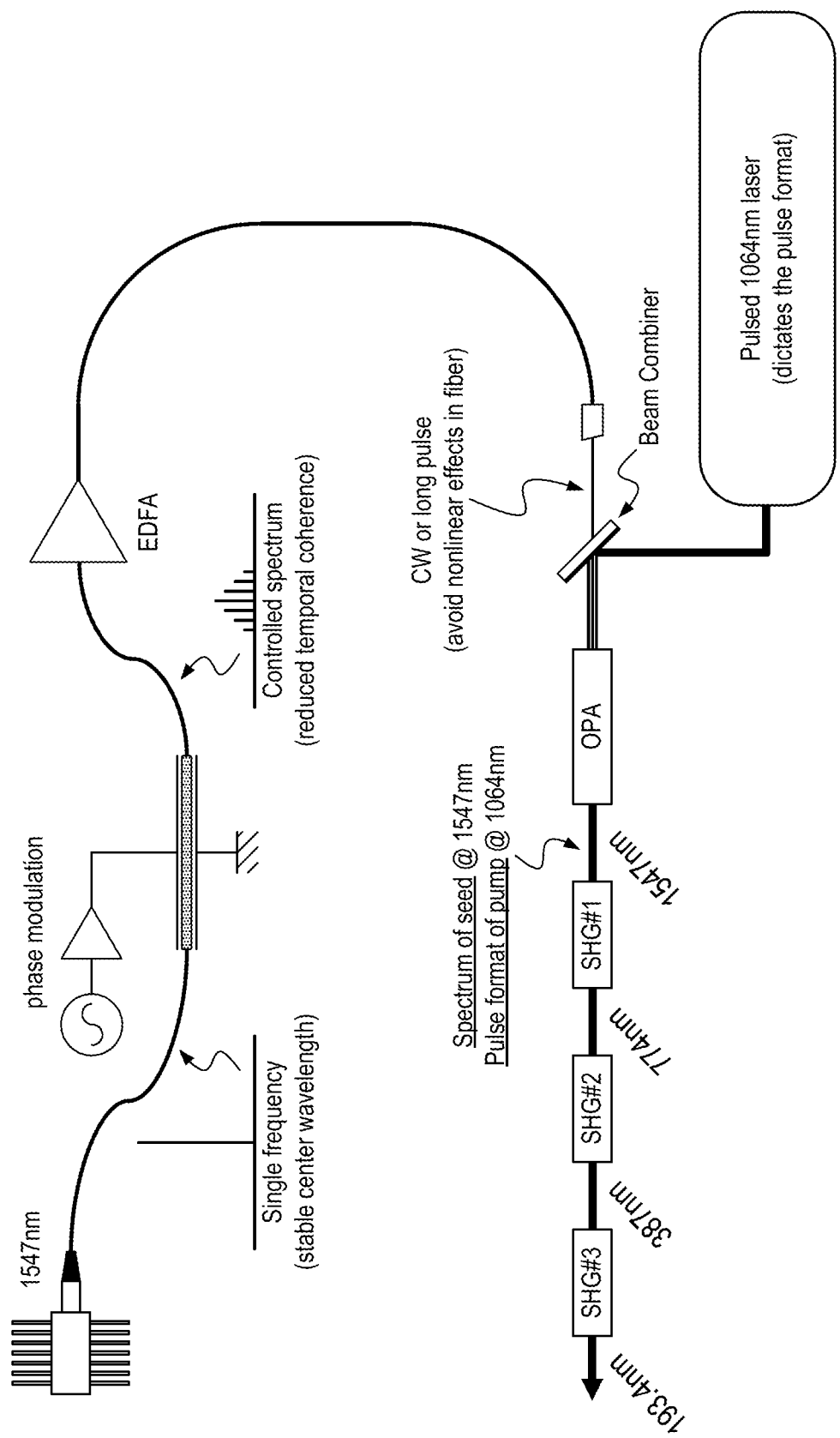
FIG. 1 illustrates a laser system in accordance with an example embodiment.

FIG. 1 illustrates a laser system in accordance with an example embodiment. In FIG. 1, a laser source with a continuous wave (CW) output at 1.547 μm is modulated in phase to broaden the spectrum and thus reduce temporal coherence. As will be described further, the spectrum produced by phase modulation ultimately dictates the resulting 193.4 nm pulses at the output of the laser system, and the output pulse format (e.g., repetition rate, pulse width, timing) is determined by the pump source of an optical parametric amplifier (OPA). Referring back to FIG. 1, the phase-modulated light with reduced temporal coherence is input to an amplifier (e.g., an erbium-doped fiber amplifier (EDFA)). A beam combiner combines the light that is amplified by the EDFA with a pulsed laser source. In this example configuration, the pulsed laser has an operating wavelength of 1064 nm. Due to the lower maximum peak power of the CW light, the nonlinear effects of fiber are reduced.

The beam combiner provides the combined beams to an OPA. An OPA uses an optical parametric amplification process (based on a nonlinear optical effect, e.g., via a nonlinear crystal, periodically polled crystals including PPKTP or PPsLT) rather than using stimulated emission processes. The OPA can be better understood by considering optical parametric generation (OPG), which sometimes precedes the OPA. In OPG, an input (known as the pump, with frequency $\omega_p$) produces two output beams of lower frequencies $\omega_s$ and $\omega_i$ (associated with a signal and an idler beam, respectively). In the OPA, two light beams, of frequencies $\omega_p$ and $\omega_s$, are input to the amplifier; the pump beam ($\omega_p$) is made weaker while the signal beam ($\omega_s$) is amplified. In addition, a new idler beam at the frequency $\omega_i$ is produced, where $\omega_p = \omega_s + \omega_i$.

In the configuration of FIG. 1, the pulsed laser is used as the pump beam and the CW beam with reduced spectral coherence is used as the signal beam (also referred to as the seed beam), which form the inputs of the OPA. The amplified signal beam at the output of the OPA has the spectral characteristics of the CW beam, which is amplified according to the pulse format of the pump pulses. Following the OPA, a series of nonlinear crystals (or generally second harmonic generators (SHGs)) can be used to obtain the desired output wavelength. In the example shown in FIG. 1, three SHGs are used to produce the eighth harmonic at the output (e.g., 193.4 nm). The SHGs can, for example, include LBO, BBO, BiBO or KTP.

Figure 2:
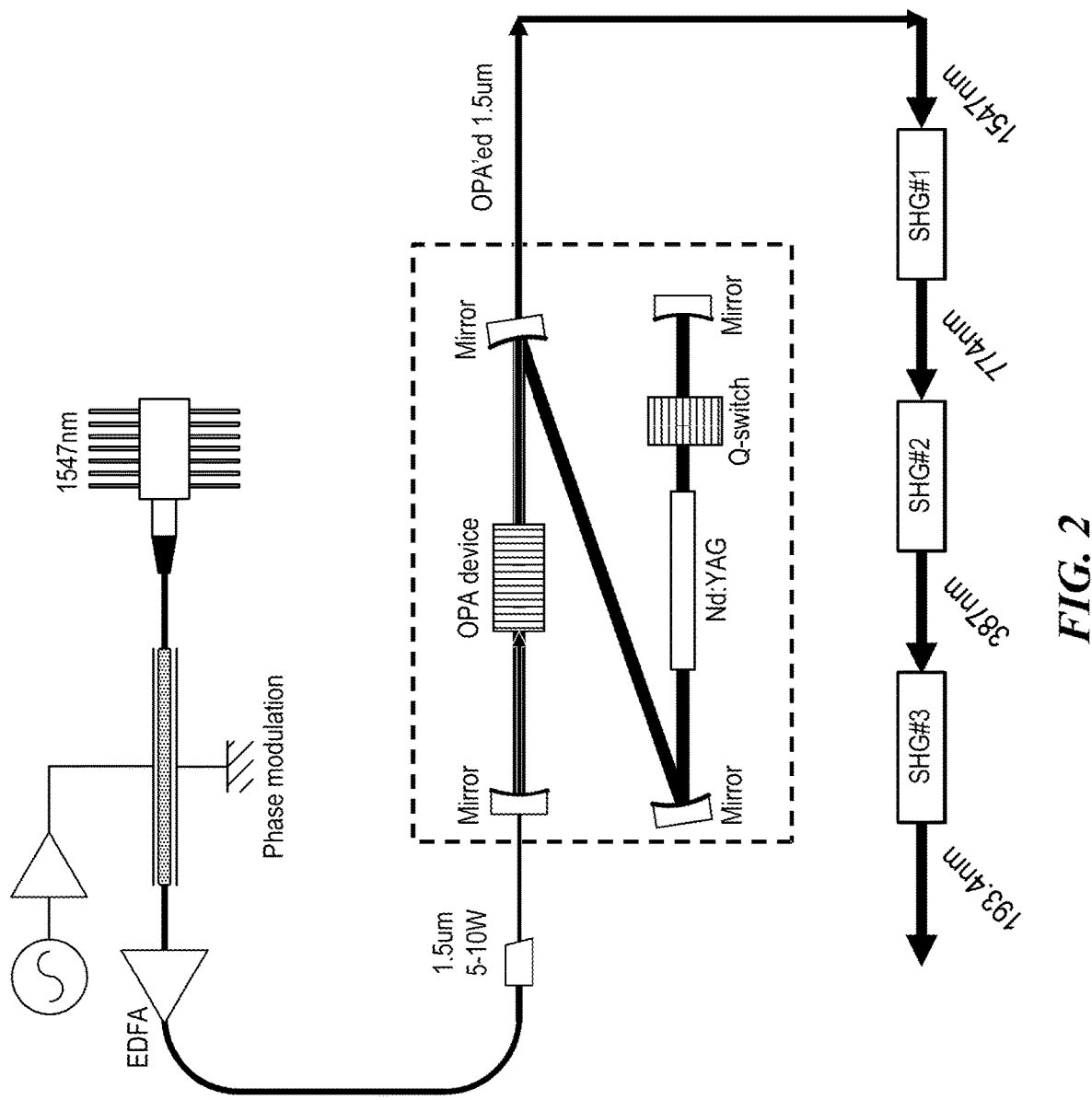
FIG. 2 illustrates another laser system in which an optical parametric amplifier is positioned inside of the laser cavity in accordance with an example embodiment.

In some embodiments, the OPA can be placed inside the pump laser cavity to increase efficiency. FIG. 2 illustrates an example laser system in which the OPA is positioned inside of the laser cavity in accordance with an example embodiment. Using some of the similar examples as in FIG. 1, the laser at 1547 nm is subject to phase modulation, following amplification by EDFA. The OPA device is positioned inside the laser cavity (dashed box), which includes reflective surfaces (e.g., four mirrors in the configuration of FIG. 2) and the laser gain medium (e.g., Nd:YAG). A Q-switch can also be included. The pump light is generated inside the cavity from the Nd:YAG or other laser gain medium that is used to generate the pump light. All the mirrors can be highly reflecting at the pump wavelength, such as at 1064 nm, which is not out-coupled. Some of the mirrors (e.g., one at the entrance and one at the output) should be highly transmissive at 1.547 μm. The first mirror after the OPA device can be such an output mirror (as shown in FIG. 2). It is desirable that it is also transmissive at the idler (difference frequency) wavelength (3.34 μm in this case). Therefore, that mirror should be made on a substrate of undoped YAG, sapphire, or calcium fluoride ($CaF_2$), or any material that does not absorb (and subsequently heat up) any of the pump, signal, or the idler wavelengths.

Figure 3:
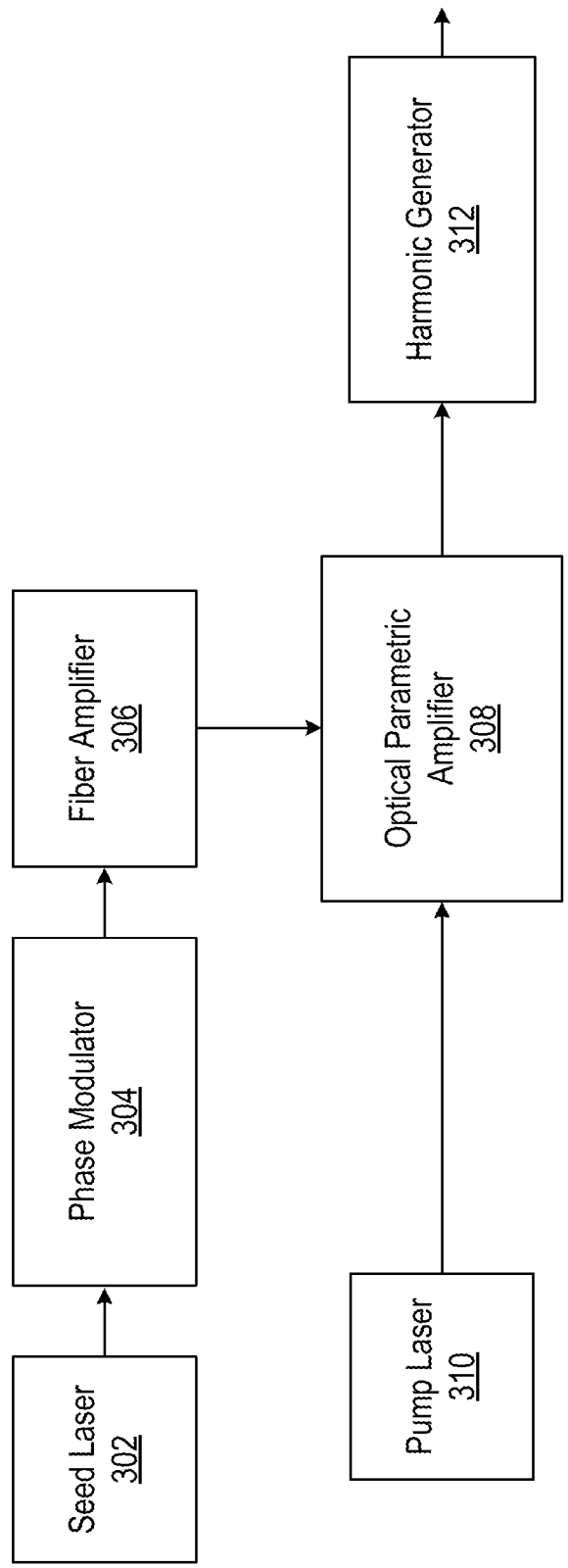
FIG. 3 illustrates a laser system for producing amplified light with reduced noise in accordance with an example embodiment.

FIG. 3 illustrates a laser system for producing amplified light with reduced noise in accordance with an example embodiment. The system includes a seed laser 302, such as a CW laser with high coherence. A phase modulator 304 is positioned to receive the light from the seed laser and to impart phase modulation; the modulation results in the spreading of reduced temporal coherence. A fiber amplifier 306 receives the phase-modulated CW laser and produces an amplified output that is provided to a first input (seed or signal input) of an optical parametric amplifier 308. The pump input of the optical parametric amplifier 308 receives a pulsed laser beam from a pump laser 310. The output of the optical parametric amplifier 308 includes an amplified output beam that operates at the frequency of the seed laser 302 but with reduced temporal coherence while having a pulsed format (i.e., temporal shape including pulse width, repetition rate, timing including rise and fall times, power) that is controlled by the pump laser 310. The temporal coherence (spectral broadening) control imparted by the phase modulator improves the output beam uniformity of the beam with reduced speckle noise.

According to some embodiments, the seed source is operable in CW at a first wavelength $\lambda 1$ (e.g., near 1.55 μm). A phase modulator applies modulation and modifies the spectrum of the CW laser. A pulsed laser operating at a pump wavelength, $\lambda 2$, where $\lambda 1 > \lambda 2$, is used to provide a pump input to an OPA, which receives the spectrally modified seed laser at another input. The OPA generates an amplified output signal operating at $\lambda 1$ based on the temporal shape of the pump laser. The result is a pulsed output at $\lambda 1$, which can be followed by harmonic conversion stages to generate a desired wavelength (e.g., ultraviolet light) at $\lambda 4$ with controlled temporal coherence by way of controlling the spectrum at $\lambda 1$. The OPA also produces another output, $\lambda 3 = (1/\lambda 2 - 1/\lambda 1)^{-1}$, which is not used. In some embodiments, the OPA material can be placed inside a laser cavity that oscillates at $\lambda 2$. The beams associated with $\lambda 1$, $\lambda 2$, and $\lambda 3$ at the OPA are sometimes referred to as the signal, pump, and idler beams, respectively. It should be noted that the sequential numbering of $\lambda$ values does not necessarily convey a sequential ordering of the actual wavelength values. For example, $\lambda 3$ can often be the smallest wavelength value.

Figure 4:
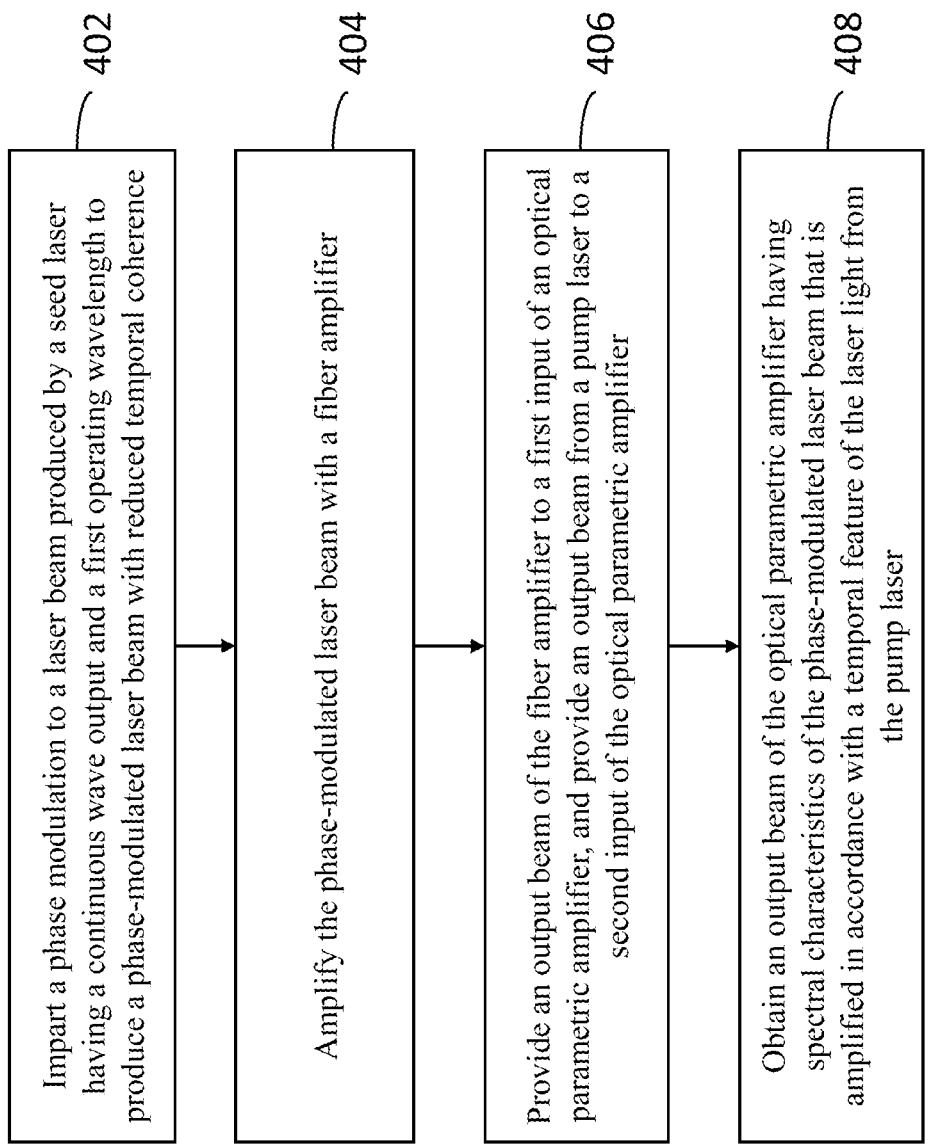
FIG. 4 illustrates a set of operations that can be carried out to generate an output laser beam in accordance with an example embodiment.

FIG. 4 illustrates a set of operations that can be carried out for generating an output laser beam in accordance with an example embodiment. At 404, a phase modulation is imparted to a laser beam produced by a seed laser having a continuous wave output and a first operating wavelength to produce a phase-modulated laser beam with reduced temporal coherence. At 404, the phase-modulated laser beam is amplified with a fiber amplifier. At 406, an output beam of the fiber amplifier is provided to a first input of an optical parametric amplifier, and an output beam from a pump laser is provided to a second input of the optical parametric amplifier. At 408, an output beam of the optical parametric amplifier is obtained, the output beam having spectral characteristics of phase-modulated laser beam that is amplified in accordance with a temporal feature of the laser light from the pump laser. In one example embodiment, the method further includes using one or more harmonic generators at the output of the optical parametric amplifier to produce an output beam having a wavelength that is a fraction of the first operating wavelength.

One aspect of the disclosed embodiments relates to a laser system that includes a seed laser having a continuous wave output and operable at a first wavelength, a phase modulator positioned to receive laser light from the seed laser and to impart phase modulation thereto; and an optical parametric amplifier positioned to receive phase-modulated laser light at a first input thereof and a pump laser light at a second input thereof, and to produce an output beam having spectral characteristics of the phase-modulated laser light that is amplified in accordance with a temporal feature of the pump laser light. An output of the optical parametric amplifier has a lower temporal coherence compared to the seed laser.

In one example embodiment, the laser system includes an optical amplifier positioned to receive an output beam from the phase modulator and operable to provide an amplified output beam to the optical parametric amplifier. In another example embodiment the optical amplifier is an erbium-doped fiber amplifier (EDFA). In yet another example embodiment, the pump laser light is produced by a pump laser that is operable to produce a series of optical pulses, and the temporal feature of the pump laser light includes one or more of a repetition rate, a pulse width, or a timing of the series of optical pulses. In still another example embodiment, the output beam of the optical parametric amplifier is amplified in accordance with a power profile of the pump laser light.

According to another example embodiment, the pump laser light has a second wavelength that is shorter than the first wavelength associated with the seed laser. In one example embodiment, the laser system further includes one or more harmonic generators configured to receive the output beam of the optical parametric amplifier and to produce one or more output beams, where each output beam of the one or more harmonic generators has a center wavelength that is a fraction of a center wavelength of the output beam of the optical parametric amplifier. In still another example embodiment, the one or more harmonic generators comprise one or more second harmonic generators. In yet another example embodiment, the first wavelength is 1547 nm, the pump laser light has a second wavelength of 1064 nm, and the output beam of the optical parametric amplifier has an operating wavelength of 1547 nm. For example, the one or more second harmonic generators include three second harmonic generators positioned to receive the output beam of the optical parametric amplifier in series, and the first wavelength is 1547 nm, the pump laser light has a second wavelength of 1064 nm, the output beam of the optical parametric amplifier has an operating wavelength of 1547 nm, and an output beam of a third second harmonic generator has a fourth wavelength of 193.4 nm.

In one example embodiment, the laser system includes a laser cavity comprising a plurality of reflective surfaces and a gain medium positioned inside of the laser cavity to allow amplification of light that propagates through the gain medium to produce the pump laser light, wherein: the optical parametric amplifier is positioned inside the laser cavity, and one of the plurality of reflective surfaces is configured to allow the output beam of the optical parametric amplifier to exit the laser cavity. In another example embodiment, the laser cavity includes a Q-switch therein. In still another example embodiment, the gain medium is associated with a Nd:YAG laser, and in another example embodiment, all of the reflective surfaces are reflective at the pump laser light's wavelength, and at least two of the plurality of reflective surfaces are transmissive at the first wavelength to allow: the phase-modulated laser light to enter the laser cavity, and the output beam of the optical parametric amplifier to exit the laser cavity. For example, in one embodiment, the first wavelength is 1547 nm, and the pump laser light's wavelength is 1064 nm.

In another example embodiment, the phase modulator is configured to impart a selectable amount of phase modulation to the laser light from the seed laser to allow control of temporal coherence of the laser light that is output from the phase modulator. In another example embodiment, the phase modulator includes a voltage source configured to apply a sinusoidally varying phase modulation to an electric field of the laser light received at the phase modulator from the seed laser. In yet another example embodiment, the pump laser light is produced by a pump laser source that is operable to produce a series of laser pulses that can be designed to have a particular repetition rate, pulse width, timing, and output power to temporally shape the output beam of the optical parametric amplifier in accordance with the series of laser pulses.

It is understood that the various disclosed embodiments may be implemented individually, or collectively, using devices comprised of various optical components, electronics hardware, and/or software modules and components. These devices, for example, may comprise a processor, a memory unit, and an interface that are communicatively connected to each other and may range from desktop and/or laptop computers to mobile devices and the like. The processor and/or controller can perform various disclosed operations based on the execution of program code that is stored on a storage medium. The processor and/or controller can, for example, be in communication with at least one memory and with at least one communication unit that enables the exchange of data and information, directly or indirectly, through the communication link with other entities, devices, and networks. The communication unit may provide wired and/or wireless communication capabilities in accordance with one or more communication protocols, and therefore it may comprise the proper transmitter/receiver antennas, circuitry, and ports, as well as the encoding/decoding capabilities that may be necessary for proper transmission and/or reception of data and other information. For example, the processor may be configured to control the operation of various laser sources or voltage sources described herein.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from the practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

I claim:

1. A laser system, comprising:
   a seed laser having a continuous wave output and operable at a first wavelength;
   a phase modulator positioned to receive laser light from the seed laser and to impart phase modulation thereto; and
   an optical parametric amplifier coupled to the phase modulator to receive phase-modulated laser light from the phase modulator at a first input thereof and a pump laser light at a second input thereof, and to produce an output beam having spectral characteristics of the phase-modulated laser light that is amplified in accordance with a temporal feature of the pump laser light, wherein:

an output of the optical parametric amplifier has a lower temporal coherence compared to the seed laser, the laser system includes a laser cavity comprising a plurality of reflective surfaces and a gain medium positioned inside of the laser cavity to allow amplification of light that propagates through the gain medium to produce the pump laser light, the optical parametric amplifier is positioned inside the laser cavity, and one of the plurality of reflective surfaces is configured to allow the output beam of the optical parametric amplifier to exit the laser cavity.

2. The laser system of claim 1, comprising an optical amplifier positioned to receive the phase-modulated laser light from the phase modulator and operable to provide an amplified version of the phase-modulated laser light to the optical parametric amplifier.

3. The laser system of claim 2, wherein the optical amplifier is an erbium-doped fiber amplifier (EDFA).

4. The laser system of claim 1, wherein the pump laser light is produced by a pump laser that is operable to produce a series of optical pulses, and wherein the temporal feature of the pump laser light includes one or more of a repetition rate, a pulse width, or a timing of the series of optical pulses.

5. The laser system of claim 1, wherein the output beam of the optical parametric amplifier is amplified in accordance with a power profile of the pump laser light.

6. The laser system of claim 1, wherein the pump laser light has a second wavelength that is shorter than the first wavelength associated with the seed laser.

7. The laser system of claim 1, further comprising one or more harmonic generators configured to receive the output beam of the optical parametric amplifier that exits the laser cavity and to produce one or more output beams, each output beam of the one or more harmonic generators having a center wavelength that is a fraction of a center wavelength of the output beam of the optical parametric amplifier.

8. The laser system of claim 7, wherein the one or more harmonic generators comprise one or more second harmonic generators.

9. The laser system of claim 8, wherein:

the one or more second harmonic generators include three second harmonic generators positioned to receive the output beam of the optical parametric amplifier that exits the laser cavity in series, and the first wavelength is 1547 nm, the pump laser light has a second wavelength of 1064 nm, the output beam of the optical parametric amplifier that exits the laser cavity has an operating wavelength of 1547 nm, and an output beam of a third second harmonic generator has a fourth wavelength of 193.4 nm.

10. The laser system of claim 1, wherein the first wavelength is 1547 nm, the pump laser light has a second wavelength of 1064 nm, and the output beam of the optical parametric amplifier has an operating wavelength of 1547 nm.

11. The laser system of claim 1, wherein the laser cavity includes a Q-switch therein.

12. The laser system of claim 1, wherein the gain medium is associated with a Nd:YAG laser.

13. The laser system of claim 1, wherein all of the reflective surfaces are reflective at a wavelength of the pump laser light, and at least two of the plurality of reflective surfaces are transmissive at the first wavelength to allow: the phase-modulated laser light to enter the laser cavity, and the output beam of the optical parametric amplifier to exit the laser cavity.

14. The laser system of claim 13, wherein the first wavelength is 1547 nm, and the pump laser light's wavelength is 1064 nm.

15. The laser system of claim 1, wherein the phase modulator is configured to impart a selectable amount of phase modulation to the laser light from the seed laser to allow control of temporal coherence of the laser light that is output from the phase modulator.

16. The laser system of claim 1, wherein the phase modulator includes a voltage source configured to apply a sinusoidally varying phase modulation to an electric field of the laser light received at the phase modulator from the seed laser.

17. The laser system of claim 1, wherein the pump laser light is produced by a pump laser source that is operable to produce a series of laser pulses that can be designed to have a particular repetition rate, pulse width, timing, and output power to temporally shape the output beam of the optical parametric amplifier in accordance with the series of laser pulses.

* * * * *